(12) United States Patent
Lu et al.

(10) Patent No.: US 11,279,992 B2
(45) Date of Patent: Mar. 22, 2022

(54) RADIATION RESISTANT HIGH-ENTROPY ALLOY AND PREPARATION METHOD THEREOF

(71) Applicant: DALIAN UNIVERSITY OF TECHNOLOGY, Liaoning (CN)

(72) Inventors: Yiping Lu, Liaoning (CN); Huanzhi Zhang, Liaoning (CN); Tingju Li, Liaoning (CN); Tongmin Wang, Liaoning (CN); Zhiqiang Cao, Liaoning (CN); Jinchuan Jie, Liaoning (CN); Huijun Kang, Liaoning (CN); Yubo Zhang, Liaoning (CN); Zongning Chen, Liaoning (CN); Enyu Guo, Liaoning (CN)

(73) Assignee: Dalian University of Technology, Dalian (CN)

( * ) Notice: Subject to any disclaimer, the term of this patent is extended or adjusted under 35 U.S.C. 154(b) by 65 days.

(21) Appl. No.: 16/723,332

(22) Filed: Dec. 20, 2019

(65) Prior Publication Data

US 2020/0239984 A1 Jul. 30, 2020

(30) Foreign Application Priority Data

Jan. 29, 2019 (CN) .......................... 201910085001.3

(51) Int. Cl.
*C22C 30/00* (2006.01)
*C22C 1/02* (2006.01)
*G21F 1/08* (2006.01)

(52) U.S. Cl.
CPC ................ *C22C 30/00* (2013.01); *C22C 1/02* (2013.01); *G21F 1/085* (2013.01)

(58) Field of Classification Search
None
See application file for complete search history.

(56) References Cited

FOREIGN PATENT DOCUMENTS

CN 107619982 * 1/2018
CN 108220742 A * 6/2018

OTHER PUBLICATIONS

English language machine translation of CN-108220742-A to Cai et al. Generated Jun. 15, 2021. (Year: 2021).*

(Continued)

*Primary Examiner* — Brian D Walck
(74) *Attorney, Agent, or Firm* — Knobbe Martens Olson & Bear LLP

(57) ABSTRACT

The present invention provides a radiation resistant high-entropy alloy and a preparation method thereof. A general formula of the radiation resistant high-entropy alloy is TiZrHfVMoTa$_x$Nb$_y$, where $0.05 \leq x \leq 0.25$, $0.05 \leq y \leq 0.5$, and x and y are molar ratios. The preparation method of the radiation resistant high-entropy alloy comprises the following steps: mixing Ti, Zr, Hf, V, Mo, Ta, and Nb in order, and conducting vacuum levitation induction melting or vacuum arc melting, to obtain the radiation resistant high-entropy alloy. The high-entropy alloy in the present invention has an excellent irradiation resistance, and does not suffer radiation hardening damage under simulated helium ion irradiation. When helium bubbles are of same sizes as those of conventional alloy, the bubble density of the high-entropy alloy is far lower than that of the conventional alloy, and the lattice constant thereof decreases abnormally after irradiation.

2 Claims, 4 Drawing Sheets

(56) References Cited

OTHER PUBLICATIONS

English language machine translation of CN107619982 to Li et al. Generated Nov. 10, 2021. (Year: 2021).*

* cited by examiner

RADIATION RESISTANT HIGH-ENTROPY ALLOY AND PREPARATION METHOD THEREOF

TECHNICAL FIELD

The present invention relates to an alloy technology, and in particular, to a radiation resistant high-entropy alloy and a preparation method thereof.

BACKGROUND

A structural material used in the nuclear power plant is usually required to have good comprehensive performance, for example, excellent mechanical properties and radiation resistance. The radiation resistance of fuel cladding materials used in nuclear reactors is particularly important. High-dose neutron irradiation produced by nuclear reactions results in vacancies, dislocation, element segregation in a material, and aggregation of H and He atoms produced by transmutation reactions can further cause material swelling, hardening, embrittlement, and even lead to a material failure. At present, fuel cladding materials and key metal components used in the nuclear power plant all suffer lattice expansion and radiation hardening damage under irradiation, which accelerates the metal failure process.

SUMMARY

An objective of the present invention is to propose a radiation resistant high-entropy alloy in view of the foregoing problem that existing conventional alloy has poor irradiation performance. The irradiation performance of the alloy is far better than that of the conventional alloy and has good mechanical properties in an as-cast condition.

To achieve the above objective, the present invention adopts the following technical solution: A radiation resistant high-entropy alloy is prepared, where its general formula is TiZrHfVMoTa$_x$Nb$_y$, in which $0.05 \leq x \leq 0.25$, $0.05 \leq y \leq 0.5$, and x and y are molar ratios.

Further, in the general formula TiZrHfVMoTa$_x$Nb$_y$, $0.1 \leq x \leq 0.2$, and $0.1 \leq y \leq 0.2$.

Another objective of the present invention is to provide a preparation method of a radiation resistant high-entropy alloy, including the following steps: stacking Ti, Zr, Hf, V, Mo, Ta, and Nb in order, and conducting vacuum levitation induction melting or vacuum arc melting to obtain the radiation resistant high-entropy alloy.

Further, the melting process includes the following steps: during fusion alloying, placing Ti, Zr, Ta, and V bottommost, and placing Nb, Mo, and Hf uppermost.

Further, in the melting process, vacuumizing is conducted to reach $5 \times 10^{-3}$ to $3 \times 10^{-3}$ Pa, and back-filing with argon gas to 0.03 to 0.05 MPa is conducted.

Further, alloy ingots are turned and melted five to seven times during vacuum arc melting, to ensure composition uniformity.

Further, alloy ingots are turned and melted four to six times during vacuum levitation induction melting, to ensure composition uniformity.

Further, Ti, Zr, Hf, V, Ta, Nb, and Mo are all industrial grade pure raw materials with a purity of over 99.5 wt %.

Another objective of the present invention is to provide an application of the radiation resistant high-entropy alloy in fuel cladding materials in the nuclear power plant reactor or key metal components of the nuclear power plant.

The radiation resistant high-entropy alloy in the present invention has a scientific and reasonable formula and an efficient preparation method. Compared with the prior art, the radiation resistant hardening alloy of the present invention has the following advantages:

1. The radiation resistant high-entropy alloy in the present invention contains specific element selection and composition, where the elements Mo, Nb, Ta, and V can improve the high-temperature properties of the alloy; the element Ti can improve the corrosion resistance of the alloy; the element Zr has excellent neutron penetrability; and the element Hf can improve the service temperature of the alloy.

2. The alloy has excellent mechanical properties in an as-cast condition, the ingots obtained by vacuum levitation induction melting or vacuum arc melting are of a single-phase BCC structure, and do not need to be subjected to any heat treatment process and deformation strengthening process. At room temperature, the engineering compressive yield strength of the alloy is up to 1.1 Gpa, and a compression rate and elongation thereof are greater than 50%.

3. The radiation resistant high-entropy alloy in the present invention has excellent ion-irradiation hardening resistance, and it is detected by an ion irradiation experiment that almost no irradiation hardening occurs in the alloy in the present invention.

4. The density of bubbles produced after helium ion irradiation on the high-entropy alloy in the present invention is an order of magnitude lower than that of conventional alloy.

5. After helium ion irradiation, the lattice constant of the alloy in the present invention decreases abnormally, while this is quite different from a case in which lattices of the conventional alloy expands and the lattice constant the conventional alloy increases after irradiation.

6. Elements in the radiation resistant high-entropy alloy in the present invention are easy to obtain, and the preparation method of the alloy is efficient, and only conventional vacuum arc smelting or vacuum electromagnetic suspension induction smelting needs to be used. The alloy can achieve excellent mechanical properties without being subject to heat treatment and a subsequent complex processing technology.

To sum up, the radiation resistant high-entropy alloy in the present invention has excellent performance: The lattice constant of the high-entropy alloy decreases abnormally after irradiation, the high-entropy alloy does not suffer hardening damage after irradiation, the density of helium bubbles of the high-entropy alloy is far lower than that of the conventional alloy. Therefore, the high-entropy alloy has a broad application prospect in nuclear industry.

DETAILED DESCRIPTION

The present invention is further described below with reference to the following embodiments:

Embodiment 1

This embodiment discloses a radiation resistant high-entropy Ti—Zf—Hf—V—Mo—Nb—Ta alloy, where its general formula is TiZrHfVMoNb$_{0.1}$Ta$_{0.1}$.

A specific preparation method of TiZrHfVMoNb$_{0.1}$Ta$_{0.1}$ includes: stacking raw materials Ti, Zr, Hf, V, Mo, Nb, and Ta in order according to a molar ratio shown by the general formula, where Ti, Zr, Hf, V, Mo, Nb, and Ta are all industrial grade pure raw materials with a purity of over 99.5 wt %; conducting vacuum levitation induction melting or vacuum arc melting; during fusion alloying, placing Ti, Zr, V, and Ta bottommost, and placing Nb, Mo, and Hf uppermost; and conducting vacuumizing to reach $5\times10^{-3}$ Pa, and back-filing with argon gas to 0.05 MPa. Each alloy ingot is melted at least five times during arc melting, to ensure composition uniformity.

Figure 1:
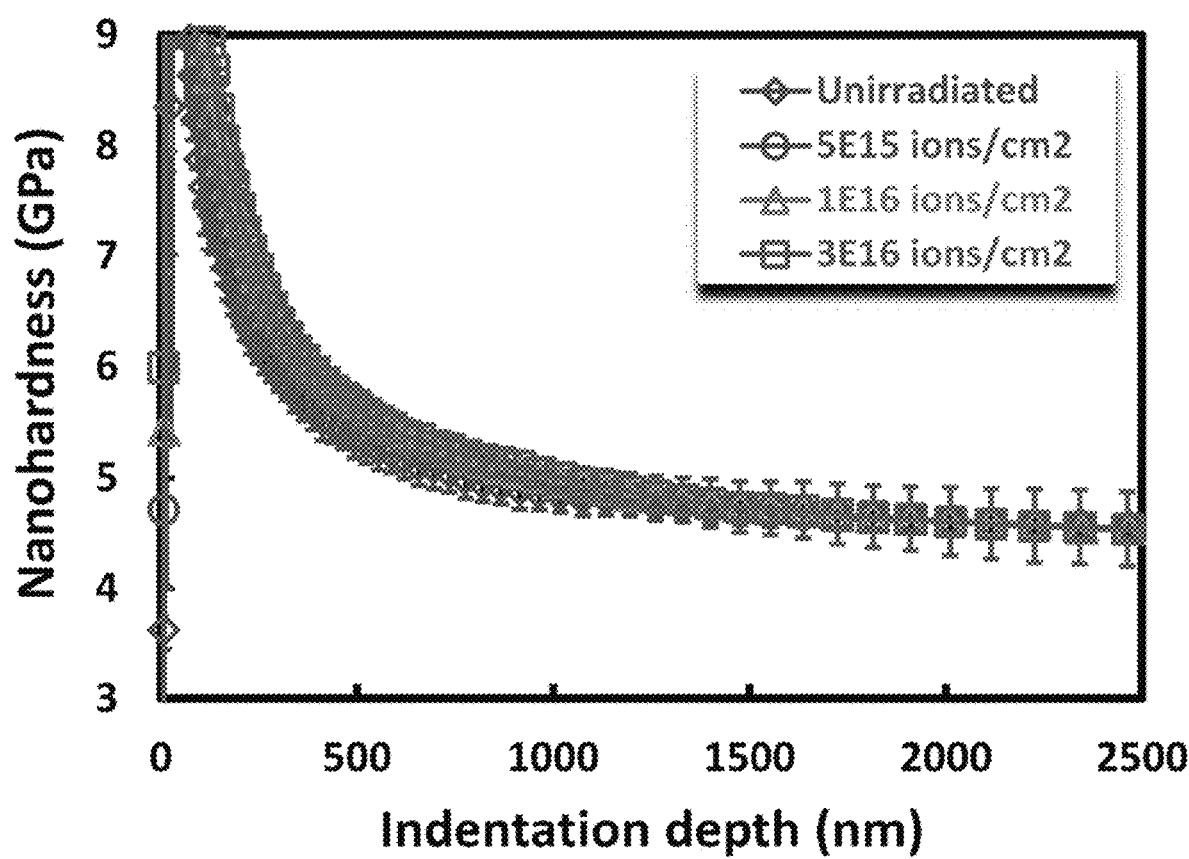
FIG. 1 shows relationships between average nano-indentation hardness and indentation depths at 600° C. before and after irradiation according to Embodiment 1, where three different doses of irradiation are $5 \times 10^{15}$, $1 \times 10^{16}$, and $3 \times 10^{16}$ ions/cm$^2$.
Figure 2:
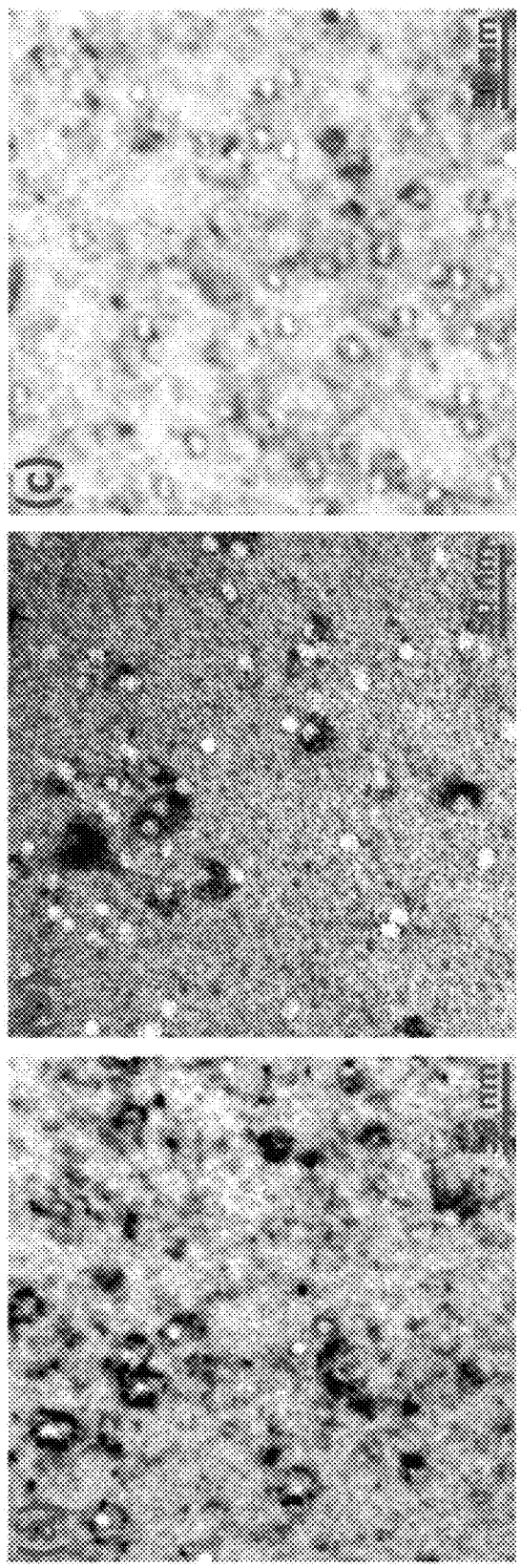
FIG. 2 shows sizes and density of helium bubbles at 600° C. under different doses of irradiation according to Embodiment 1, where three different doses of irradiation are (a) $5 \times 10^{15}$, (b) $1 \times 10^{16}$, and (c) $3 \times 10^{16}$ ions/cm$^2$.
Figure 3:
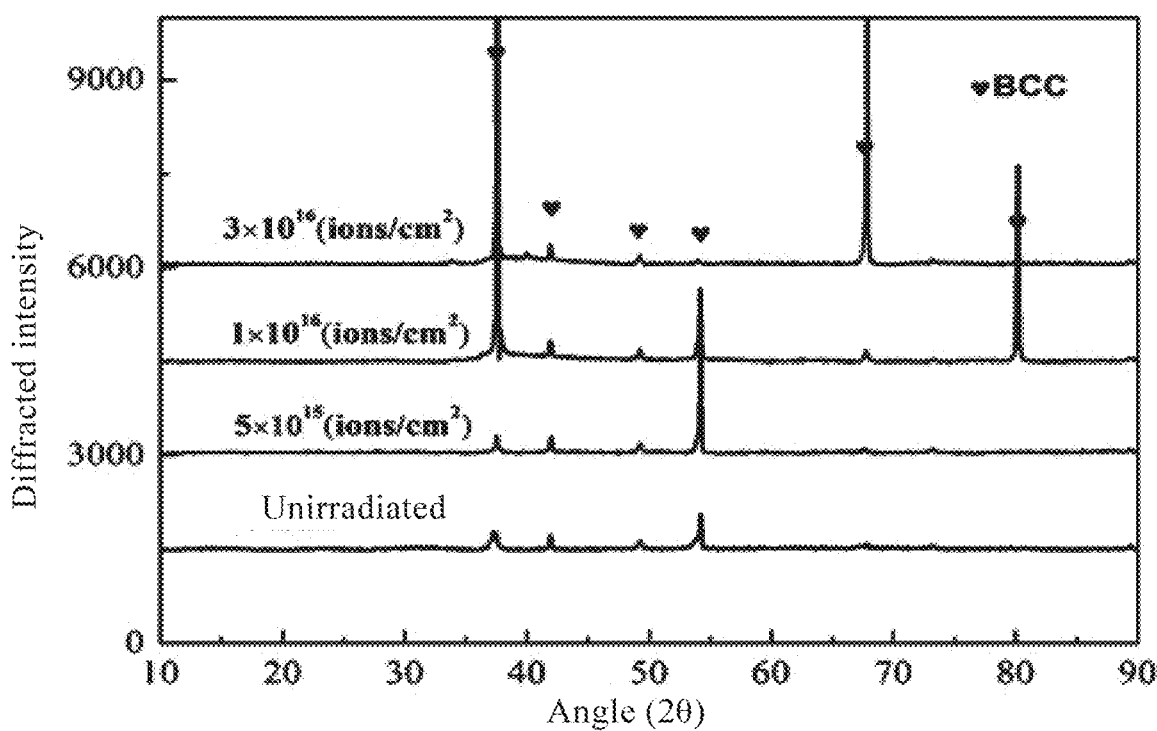
FIG. 3 shows XRD diffraction analysis patterns of radiation resistant high-entropy alloy before and after irradiation experiments according to Embodiment 1, where three different doses of irradiation are (a) $5 \times 10^{15}$, (b) $1 \times 10^{16}$, and (c) $3 \times 10^{16}$ ions/cm$^2$.
Figure 4:
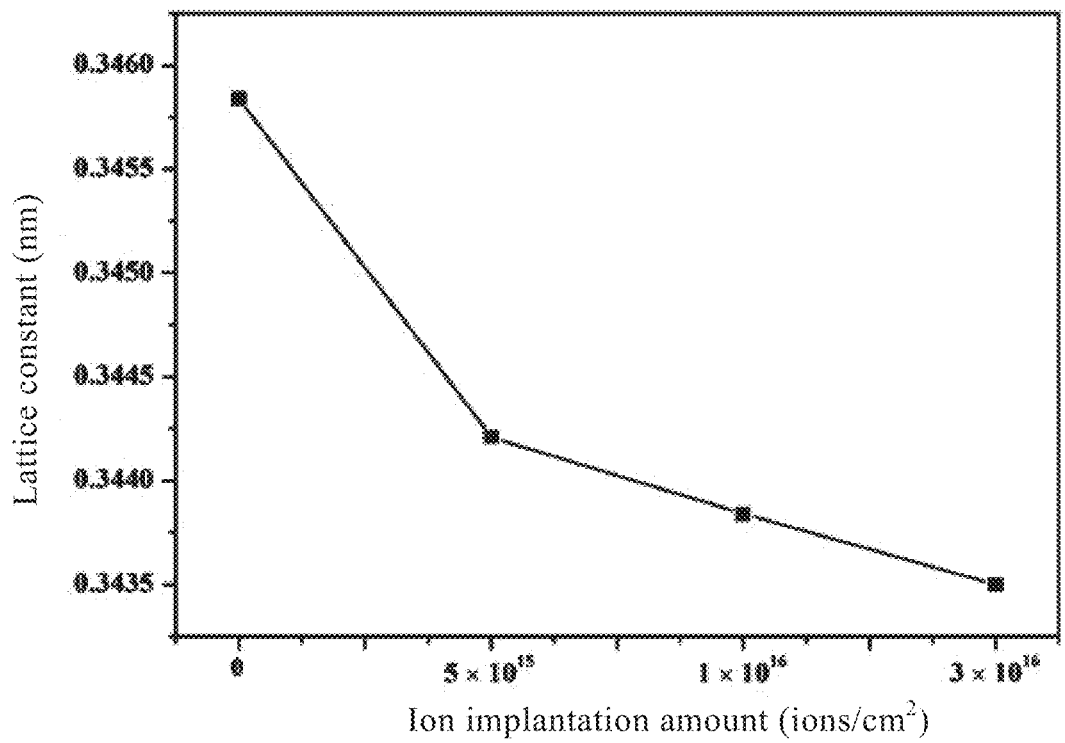
FIG. 4 shows a variation trend of a lattice constant of radiation resistant high-entropy alloy as an irradiation dose changes according to Embodiment 1, where three different doses of irradiation are (a) $5\times10^{15}$, (b) $1\times10^{16}$, and (c) $3\times10^{16}$ ions/cm$^2$.

FIG. 1 shows relationships between average nano-indentation hardness and indentation depths at 600° C. before and after irradiation according to Embodiment 1, and shows that a radiation hardening damage behavior of conventional alloy does not occur on the alloy after irradiation. FIG. 2 shows sizes and density of helium bubbles at 600° C. under different doses of irradiation according to Embodiment 1, and shows that the density of helium bubbles of the alloy after irradiation is lower than that of conventional alloy. FIG. 3 shows XRD diffraction analysis patterns of TiZrHfVMoNb$_{0.1}$Ta$_{0.1}$ before and after irradiation experiments according to this embodiment. FIG. 4 shows a variation trend of a lattice constant of radiation resistant high-entropy alloy as an irradiation dose changes according to this embodiment. FIG. 3 and FIG. 4 show that the lattice constant of the alloy after irradiation decreases, while the lattice constant of conventional alloy after irradiation increases, and therefore an irradiation behavior of the alloy is quite different from that of the conventional alloy.

An alloy irradiation experiment process is as follows: First, a sample of the irradiation resistant high-entropy alloy in this embodiment is cut into slices with a thickness of 1 mm (10 mm×6.5 mm) and is subjected to double-sided fine grinding and single-side polishing. Then, a test sample is placed in an aqueous solution containing 50% H$_2$SO$_4$ and 40% glycerol for electropolishing at a voltage of 36V for 10 seconds, and is subjected to ultrasonic cleaning with acetone, anhydrous ethanol, and deionized water. An irradiation experiment is conducted on the prepared sample at 600° C., where helium ion irradiation with energy of 3 MeV is adopted, and irradiation doses are $5\times10^{15}$, $1\times10^{16}$, and $3\times10^{16}$ ions/cm$^2$, respectively.

Figure 5:
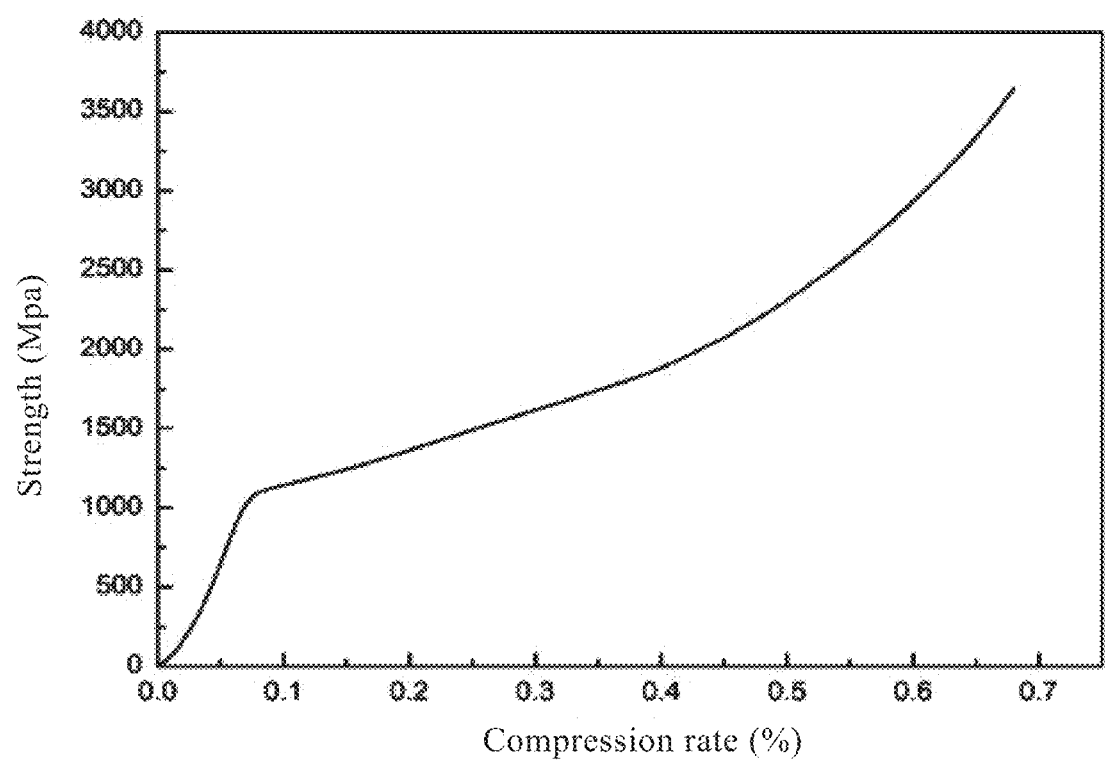
FIG. 5 shows a compression curve of radiation resistant high-entropy alloy at room temperature according to Embodiment 1.

FIG. 5 shows a compression curve of radiation resistant high-entropy alloy at room temperature according to Embodiment 1, and shows excellent mechanical properties of the alloy.

Embodiment 2

This embodiment discloses a radiation resistant high-entropy alloy, where its general formula is TiZrHfVMoNb$_{0.2}$Ta$_{0.2}$. A preparation method of the radiation resistant high-entropy alloy in this embodiment is the same as that in Embodiment 1.

It is detected that TiZrHfVMoNb$_{0.2}$Ta$_{0.2}$ in this embodiment and TiZrHfVMoNb$_{0.1}$Ta$_{0.1}$ in Embodiment 1 both have excellent mechanical properties and radiation resistance, and can be widely applied to fuel cladding materials in the nuclear power plant reactor or key metal components of the nuclear power plant.

The present invention is not limited to description of the radiation resistant high-entropy alloy according to either of claims 1 and 2, where changes in x and y and modifications made to the preparation method all fall within the protection scope of the present invention.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An alloy, wherein its general formula is TiZrHfVMoTa$_x$Nb$_y$, wherein $0.05 \leq x \leq 0.25$, $0.05 \leq y \leq 0.5$, and x and y are molar ratios.

2. The alloy according to claim 1, wherein $0.1 \leq x \leq 0.2$ and $0.1 \leq y \leq 0.2$.

* * * * *